United States Patent
Ohshima et al.

(10) Patent No.: US 7,848,699 B2
(45) Date of Patent: Dec. 7, 2010

(54) ACCESSORY DEVICE, ELECTRONIC MUSICAL INSTRUMENT AND TEACHING APPARATUS

(75) Inventors: Osamu Ohshima, Hamamatsu (JP); Kenichi Nishida, Hamamatsu (JP); Yoshinari Nakamura, Hamamatsu (JP); Shinya Sakurada, Hamamatsu (JP); Atsushi Fukada, Hamamatsu (JP)

(73) Assignee: Yamaha Corporation (JP)

( * ) Notice: Subject to any disclaimer, the term of this patent is extended or adjusted under 35 U.S.C. 154(b) by 696 days.

(21) Appl. No.: 11/690,274

(22) Filed: Mar. 23, 2007

(65) Prior Publication Data
US 2007/0243513 A1   Oct. 18, 2007

(30) Foreign Application Priority Data
Mar. 29, 2006   (JP) ............................. 2006-090885

(51) Int. Cl.
G09B 11/00   (2006.01)
G10F 1/12   (2006.01)

(52) U.S. Cl. .................... 434/307 R; 84/600; 84/470 R

(58) Field of Classification Search ............ 434/307 R, 434/307 A, 319; 84/600, 470 R, 477 R, 478, 84/483.1, 483.2, 485 R
See application file for complete search history.

(56) References Cited

U.S. PATENT DOCUMENTS 6,211,451 B1   4/2001   Tohgi et al.
6,729,884 B1 *   5/2004   Kelton et al. ................. 434/236
7,323,631 B2 *   1/2008   Miyaki et al. .................. 84/616
2002/0002896 A1 *   1/2002   Hasegawa ..................... 84/609
2005/0255914 A1 *   11/2005   McHale et al. ................. 463/31
2006/0196343 A1 *   9/2006   Yung ........................ 84/470 R

FOREIGN PATENT DOCUMENTS

JP   11-219104 A   8/1999

* cited by examiner

Primary Examiner—Kathleen Mosser
(74) Attorney, Agent, or Firm—Rossi, Kimms & McDowell LLP

(57) ABSTRACT

In an electronic musical instrument, an interface part obtains user information from a dedicated accessory device logically connected to the electronic musical instrument. An access part accesses a server using the user information obtained through the interface part. A character information acquisition part obtains character information which represents a character and which corresponds to the user information, from the server or the dedicated accessory device. A lesson information acquisition part obtains, from the server, lesson information which represents a lesson work to be practiced. A control part performs control operation to display the character created based on the character information obtained by the character information acquisition part while the electronic musical instrument is logically connected to the dedicated accessory device through the interface part, and to display the lesson information when the lesson information has been obtained by the lesson information acquisition part.

11 Claims, 12 Drawing Sheets

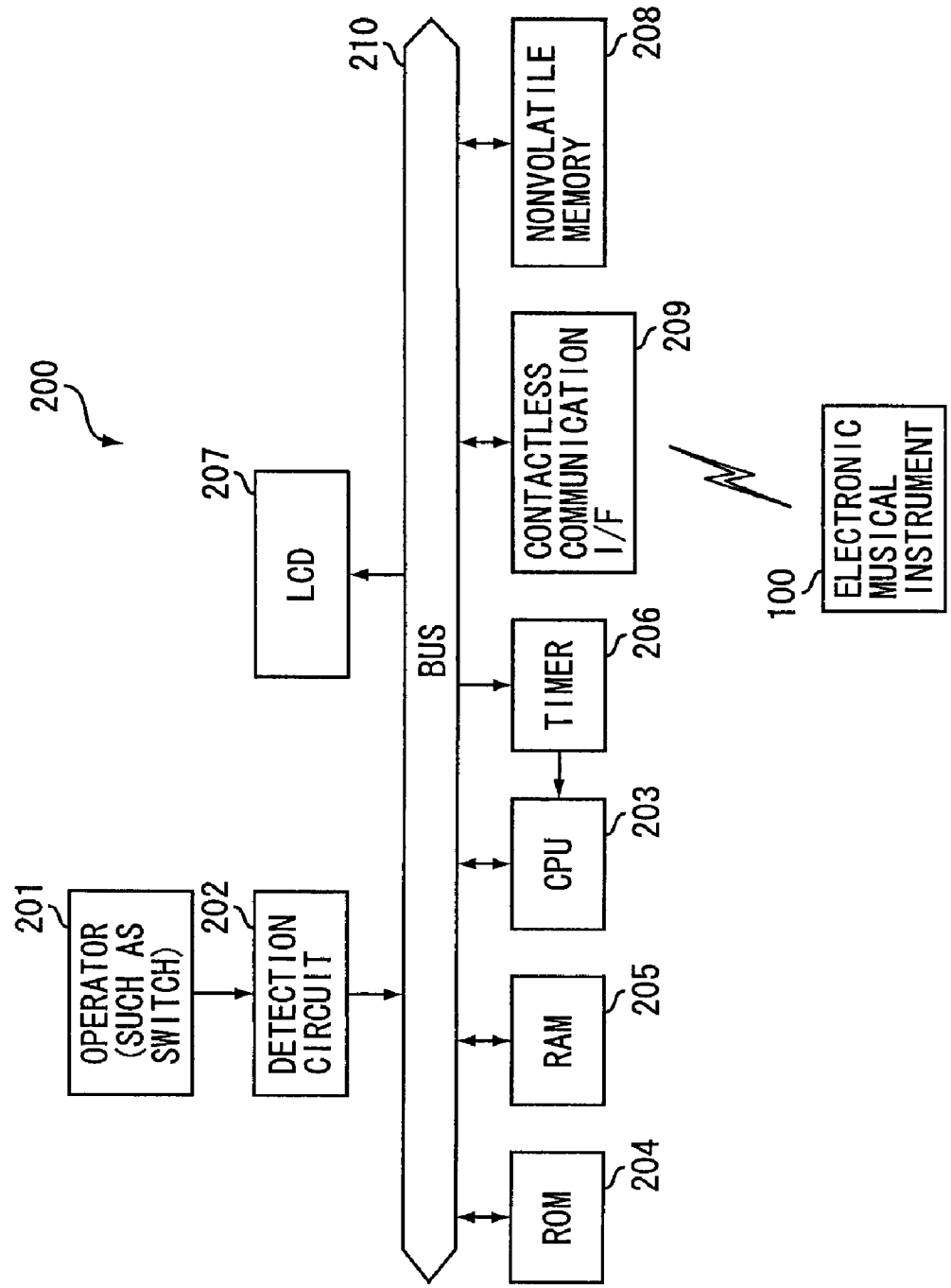

ACCESSORY DEVICE, ELECTRONIC MUSICAL INSTRUMENT AND TEACHING APPARATUS

BACKGROUND OF THE INVENTION

1. Technical Field of the Invention

The present invention relates to an accessory device, an electronic musical instrument, a teaching apparatus, and a program that are used for teaching music.

2. Description of the Related Art

An electronic musical instrument and a teaching apparatus for use in teaching music are known in the art.

In a conventional music teaching system as a combination of the electronic musical instrument and the teaching apparatus, a teacher terminal (a teacher device) for a teacher and a student terminal for a student are connected through a wide area network, and the teacher terminal receives results of a practice that the student has conducted using the student terminal, and the teacher listens to the received practice results and sends advice about musical sense and skill to the student terminal (for example, see Japanese Patent Application Publication No. 11-219104).

However, although the conventional music teaching system can present the advice of the teacher, the student cannot practice a music performance with the student terminal since the student terminal is a mere personal computer (PC). In order to practice a music performance, it is necessary to connect a keyboard instrument or the like to the student terminal. In addition, to transmit practice results to the teacher terminal, it is necessary to connect the student terminal to the wide area network since the student terminal is connected to the teacher terminal through the wide area network. Especially, an operation for the connection is difficult for young students.

In addition, although it is desired to increase the motivation of the performance practice of students who commute to a musical classroom, the conventional music teaching system cannot increase the motivation since this system is targeted at remote music teaching and does not support home practices of students who commute to the musical classroom.

SUMMARY OF THE INVENTION

The present invention has been made in view of the above circumstances, and it is an object of the invention to provide an accessory device, an electronic musical instrument, a teaching apparatus, and a program that can increase the motivation of performance practice of the student and that can also allow the student to keep up the performance practice with enjoyment.

An accessory device according to the invention comprises: a nonvolatile storage part that stores character information representing a feature of a character; an interface part that reads and writes the character information from and to an external device which is logically connected to the accessory device; a display; and a control part that performs control operation to display the character created based on the character information stored in the nonvolatile storage part, on the display, and to hide the character from the display while the accessory device is logically connected to the external device through the interface part.

Preferably, the inventive accessory device further comprises an operator which is operable by a user; and a change part that changes the character information stored in the nonvolatile storage part according to an operation of the operator or an elapsed time.

Preferably, the interface part comprises a contactless interface of a proximity type or a neighborhood type, which is capable of logically connecting the external device when the accessory device is placed in proximity or nationhood of the external device. Alternatively, the interface part comprises a contact-type interface having exposed electrodes for electric contact with the external device or having a connector for connection with the external device.

An electronic musical instrument according to the invention comprises: an interface part that obtains at least user information from a dedicated accessory device logically connected to the electronic musical instrument; an access part that accesses a server using the user information obtained through the interface part; a character information acquisition part that obtains character information which represents a character and which corresponds to the user information, from the server or the dedicated accessory device; a lesson information acquisition part that obtains, from the server lesson information which represents a lesson work to be practiced and which corresponds to the user information; a display; and a control part that performs control operation to display the character created based on the character information obtained by the character information acquisition part, on the display while the electronic musical instrument is logically connected to the dedicated accessory device through the interface part, and to display the lesson information on the display when the lesson information has been obtained by the lesson information acquisition part.

Preferably, the inventive electronic musical instrument further comprises: a reward information acquisition part that obtains, from the server reward information which represents a reward to practicing of the lesson work and which corresponds to the user information; a change part that changes the obtained character information using the reward information obtained by the reward information acquisition part; and an updating part that updates the character information which corresponds to the user information and which is present in the server or the dedicated accessory device in accordance with the changed character information, wherein the control part performs the control operation to display the character created based on the changed character information on the display.

Preferably, the inventive electronic musical instrument further comprises: a recording part that records a performance operation of the electronic musical instrument that is performed for practicing the lesson work while the electronic musical instrument is logically connected to the dedicated accessory device; and another change part that changes practice record information which corresponds to the user information and which is present in the server, based on a record of the performance operation recorded by the recording part.

Preferably, the interface part comprises a contactless interface of a proximity type or a neighborhood type, which is capable of logically connecting the dedicated accessory device when the dedicated accessory device is brought into proximity or nationhood of the contactless interface. Alternatively, the interface part comprises a contact-type interface having exposed electrodes for electric contact with the dedicated accessory device or having a connector for connection with the dedicated accessory device.

An inventive machine readable medium contains a program executable by a computer to perform: an access process of accessing a server using user information which is obtained from a dedicated accessory device through an interface to which the dedicated accessory device is logically connected; a character information acquisition process of obtaining character information which represents a character and which corresponds to the user information from the server or the dedicated accessory device; a lesson information acquisition process of obtaining lesson information which represents a lesson work to be practiced and which corresponds to the user information from the server; and a control process of performing control operation to display the character created based on the character information obtained by the character information acquisition process, on a display while the dedicated accessory device is logically connected to the interface, and to display the lesson information on the display when the lesson information has been obtained by the lesson information acquisition process.

A teaching apparatus according to the invention comprises: an interface part that obtains at least user information which indicates a student from a dedicated accessory device logically connected to the teaching apparatus; an access part that accesses a server using the user information obtained through the interface part; a character information acquisition part that obtains character information which represents a character and which corresponds to the user information from the server or the dedicated accessory device; an input part that inputs reward information which represents a reward to practicing of a lesson work by the student; a registration part that registers the reward information inputted through the input part on the server in association with the user information; a display; and a control part that performs control operation to display the character created based on the character information obtained by the character information acquisition part, on the display while the teaching apparatus is logically connected to the dedicated accessory device through the interface part.

Preferably, the inventive teaching apparatus further comprises a practice record information acquisition part that obtains practice record information associated with the user information, the practice record information being present on the server and representing a record of the practicing of the lesson work by the student, wherein the control part performs control operation to display the practice record information obtained by the practice record information acquisition part on the display.

Preferably, the interface part comprises a contactless interface of a proximity type or a neighborhood type, which is capable of logically connecting the dedicated accessory device when the dedicated accessory device is brought into proximity or nationhood of the contactless interface. Alternatively, the interface part comprises a contact-type interface having exposed electrodes for electric contact with the dedicated accessory device or having a connector for connection with the dedicated accessory device.

Another inventive machine readable medium contains a program executable by a computer to perform: an access process of accessing a server using user information which identifies a student and which is obtained from a dedicated accessory device through an interface to which the dedicated accessory device is logically connected; a character information acquisition process of obtaining character information which represents a character and which corresponds to the user information from the server or the dedicated accessory device; a registration process of registering reward information on the server in association with the user information, the reward information representing a reward to practicing of a lesson work by the student; and a control process of performing control operation to display the character created based on the character information obtained by the character information acquisition process, on a display while the dedicated accessory device is logically connected to the interface.

According to the invention, a character created based on the character information stored in the nonvolatile storage part is displayed on the display unit, and the character is hidden from the display unit while the accessory device is logically connected to the external device through the interface part. Accordingly, a person who operates the electronic musical instrument or the accessory device can operate it with a sense of identity with the character such that the person can practice together with the character with enjoyment.

According to the invention, a character created based on the character information obtained by the character information acquisition part is displayed on the display unit while the electronic musical instrument is logically connected to the dedicated accessory device through the interface part, and the lesson information is displayed on the display unit when the lesson information has been obtained. Accordingly, the student can take the lesson with enjoyment.

According to the invention, it is possible to increase the motivation of the performance practice of the student since the student can receive the reward information.

BRIEF DESCRIPTION OF THE DRAWINGS

FIG. 4 is a schematic block diagram of the accessory device of FIG. 3.

DETAILED DESCRIPTION OF THE INVENTION

Embodiments of the present invention will now be described in detail with reference to the drawings.

Figure 1:
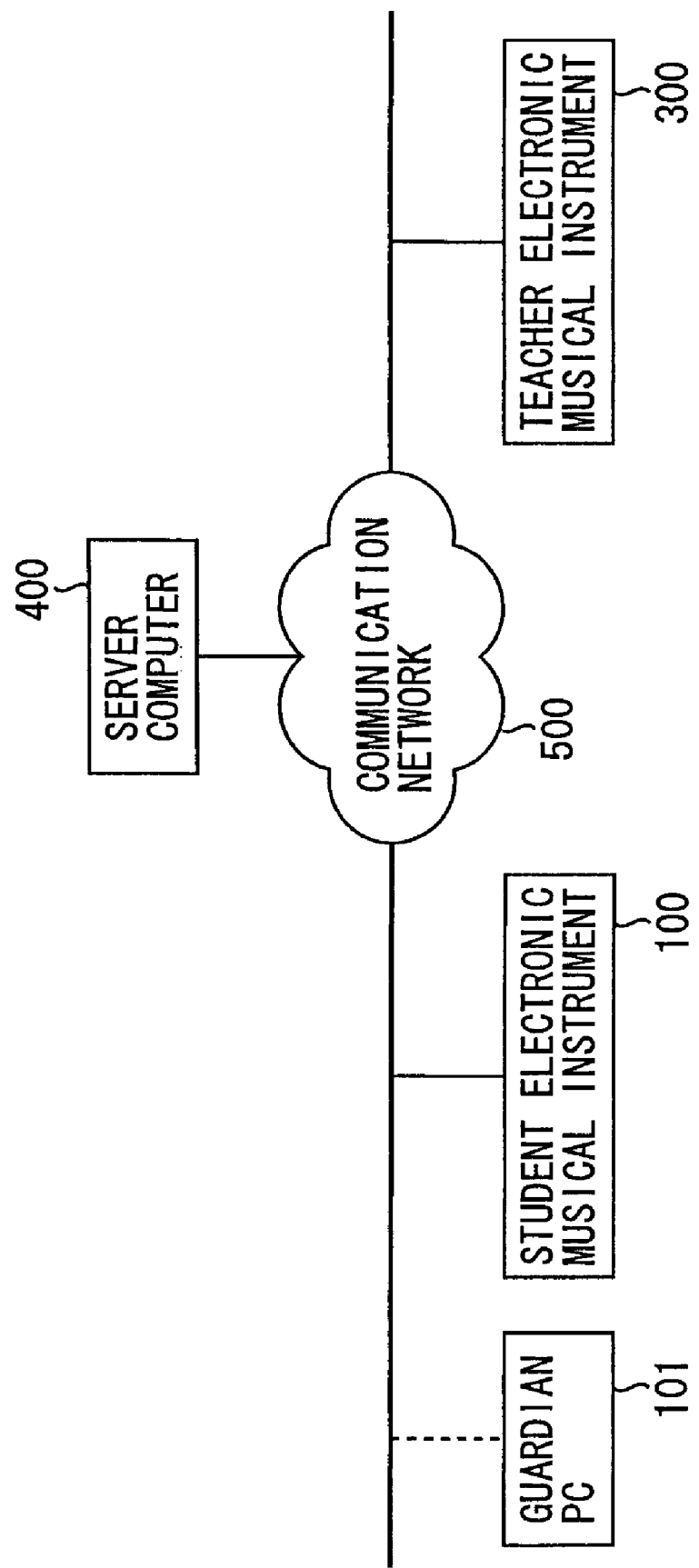
FIG. 1 illustrates an example configuration of a music teaching system including an electronic musical instrument according to an embodiment of the invention.

FIG. 1 illustrates an example configuration of a music teaching system including an electronic musical instrument according to an embodiment of the invention.

As shown in FIG. 1, the music teaching system of this embodiment includes a student electronic musical instrument 100, a guardian PC 101, a teacher electronic musical instrument 300, and a server computer 400 (that will be referred to as a "server" for short). The devices 100, 101, 300, and 400 are connected to each other through a communication network 500.

The guardian PC 101 may be omitted since this device is not essential for the music teaching system of this embodiment. The teacher electronic musical instrument 300 is not necessarily embodied as a musical instrument and may also be embodied as a PC.

Figure 2:
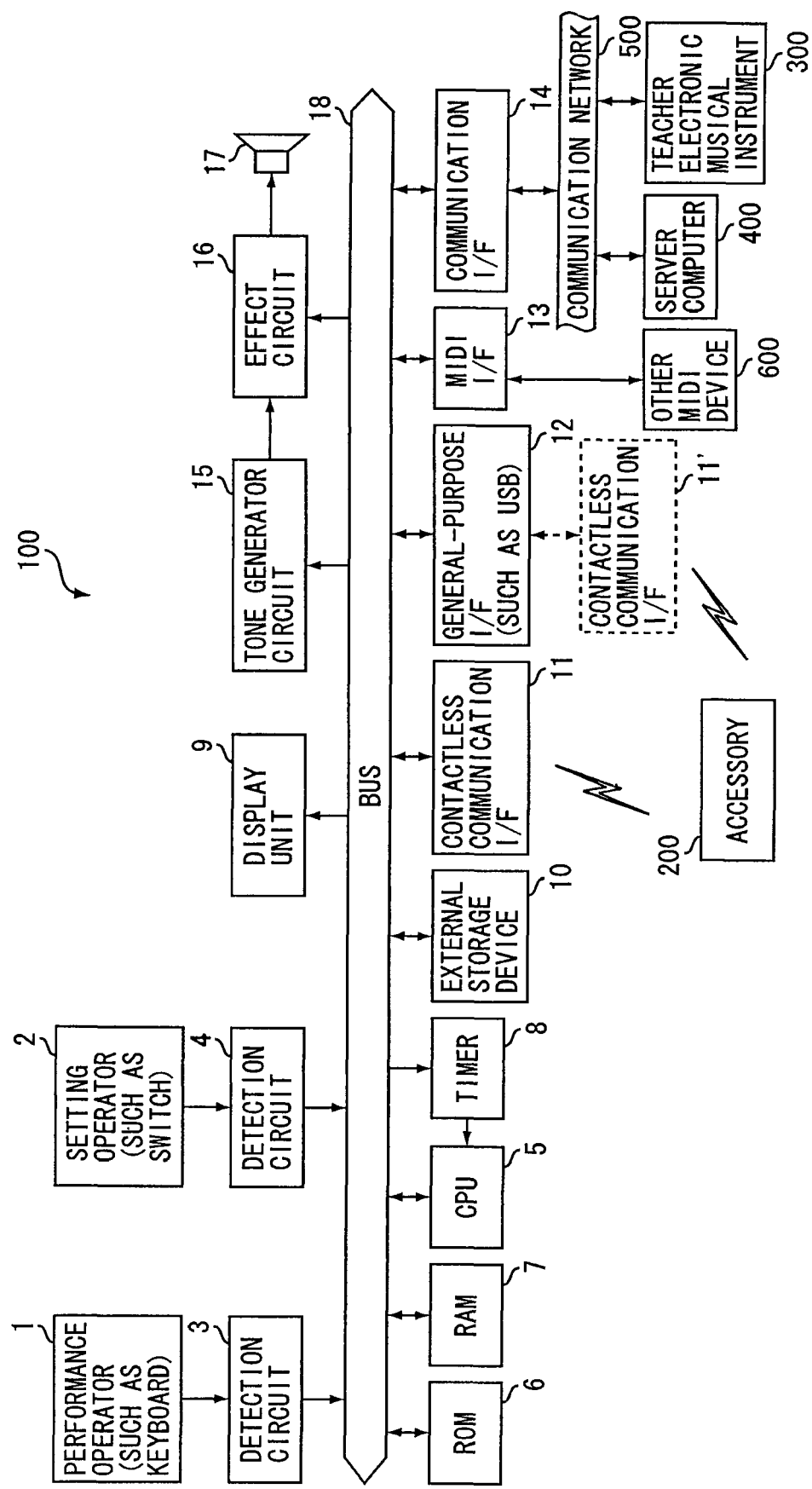
FIG. 2 is a block diagram of a schematic configuration of a student electronic musical instrument in FIG. 1.

FIG. 2 is a block diagram of a schematic configuration of the student electronic musical instrument 100.

As shown in FIG. 2, the student electronic musical instrument 100 includes a performance operator 1, a setting operator 2, a detection circuit 3, a detection circuit 4, a CPU 5, a ROM 6, a RAM 7, a timer 8, a display unit 9, an external storage device 10, a contactless communication interface (I/F) 11, a general-purpose interface (I/F) 12, a Musical instrument Digital Interface (MIDI) interface (I/F) 13, a communication interface (I/F) 14, a tone generator circuit 15, an effect circuit 16, and a sound system 17. The performance operator 1 includes a keyboard for inputting pitch information. The setting operator 2 includes a joystick and a plurality of switches or a wheel for inputting a variety of information. The detection circuit 3 detects operating states of the performance operator 1. The detection circuit 4 detects operating states of the setting operator 2. The CPU 5 controls overall operations of the student electronic musical instrument 100. The ROM 6 stores a control program to be executed by the CPU 5 or a variety of table data. The timer 8 measures an interrupt time in a timer interrupt process and various other times. The display unit 9 includes, for example, a liquid crystal display (LCD), a light emitting diode (LED), and the like for displaying a variety of information or the like. The external storage device 10 is a machine readable medium and stores a variety of application programs including the control program, a variety of music data, and various other data. Through the contactless communication interface 11, the student electronic musical instrument 100 performs contactless communication with an accessory device 200. Through the general-purpose interface 12, the student electronic musical instrument 100 is connected to other devices. Through the MIDI interface 13, a MIDI message is input and output to and from the student electronic musical instrument 100. The communication interface 14 performs data communication with, for example, the teacher electronic musical instrument 300 or the server 400 through the communication network 500. The tone generator circuit 15 converts preset performance data or performance data input through the performance operator 1 into a musical sound signal. The effect circuit 16 imparts a variety of effects to a musical sound signal from the tone generator circuit 15. The sound system 17 includes, for example, an amplifier, a speaker, or a digital to analog converter (DAC) for converting a musical sound signal from the effect circuit 16 into sound.

The components 3 to 16 are connected to each other through a bus 18. The timer 8 is connected to the CPU 5. Another MIDI device 600 is connected to the MIDI interface 13. The communication network 500 is connected to the communication interface 14. The effect circuit 16 is connected to the music circuit 15. The sound system 17 is connected to the effect circuit 16. Each of the communication interface 14 and the communication network 500 is not limited to a wired type and may also be of a wireless type. A communication interface and a communication network of both the types may also be provided.

Examples of the external storage device 10 include a floppy disk drive (FDD), a hard disk drive (HDD), a CD-ROM drive, and a magneto-optical disc (MO) drive. The control program which is to be executed by the CPU 5 as described above can also be stored in the external storage device 10. In the case where no control program is stored in the ROM 6, the control program can be stored in the external storage device 10 and then be loaded into the RAM 7, thereby causing the CPU 5 to perform the same operation as that when the control program is stored in the ROM 6. This makes it easy to add another control program or to update the version of the control program.

Any communication type of interface can be employed as the contactless communication interface 11 provided that it can perform contactless communication. For example, a Bluetooth or infrared communication interface or a Radio Frequency Identification (RFID) interface can be employed as the contactless communication interface 11. It is preferable to employ a type of interface which can perform communication with an object only when the object is very close to the interface (for example, within 3 cm) or a type of interface that has a distance detector and thus can determine whether or not an object is very close to the interface (for example, within 3 cm).

Examples of the general-purpose interface 12 include an RS-232C or Universal Serial Bus (USB) interface and IEEE (pronounced "I triple E") 1394 interface. When a contactless communication interface 11' such as a commercially available RFID reader is externally connected to the general-purpose interface 12, the student electronic musical instrument 100 may not include the contactless communication interface 11.

As described above, the communication interface 14 is connected to the communication network 500, for example to a Local Area Network (LAN), the Internet, or a telephone line, and is connected to the server 400 through the communication network 500. In the case where the programs and the variety of parameters are not stored in the external storage device 10, the communication interface 14 is used to download the programs and parameters from the server 400. As a client, the electronic musical device transmits a command, which requests download of programs or parameters, to the server 400 through the communication interface 14 and the communication network 400. Upon receiving the command, the server 400 distributes the requested programs or parameters to the electronic musical device through the communication network 500 and the electronic musical device receives the programs or parameters through the communication interface 14 and stores them in the external storage device 10, thereby completing the download.

Although the student electronic musical instrument 100 is of a keyboard instrument type in this embodiment, it is not limited to the keyboard type and may also be a string instrument type, a wind instrument type, or a percussion instrument type.

The teacher electronic musical instrument 300 includes the same components as those of the student electronic musical instrument 100. The guardian PC 101 includes a general-purpose personal computer and the server 400 includes a general-purpose server computer. In the case where the teacher electronic musical instrument 300 is embodied as a PC type, it is constructed of a general-purpose personal computer.

Figure 3:
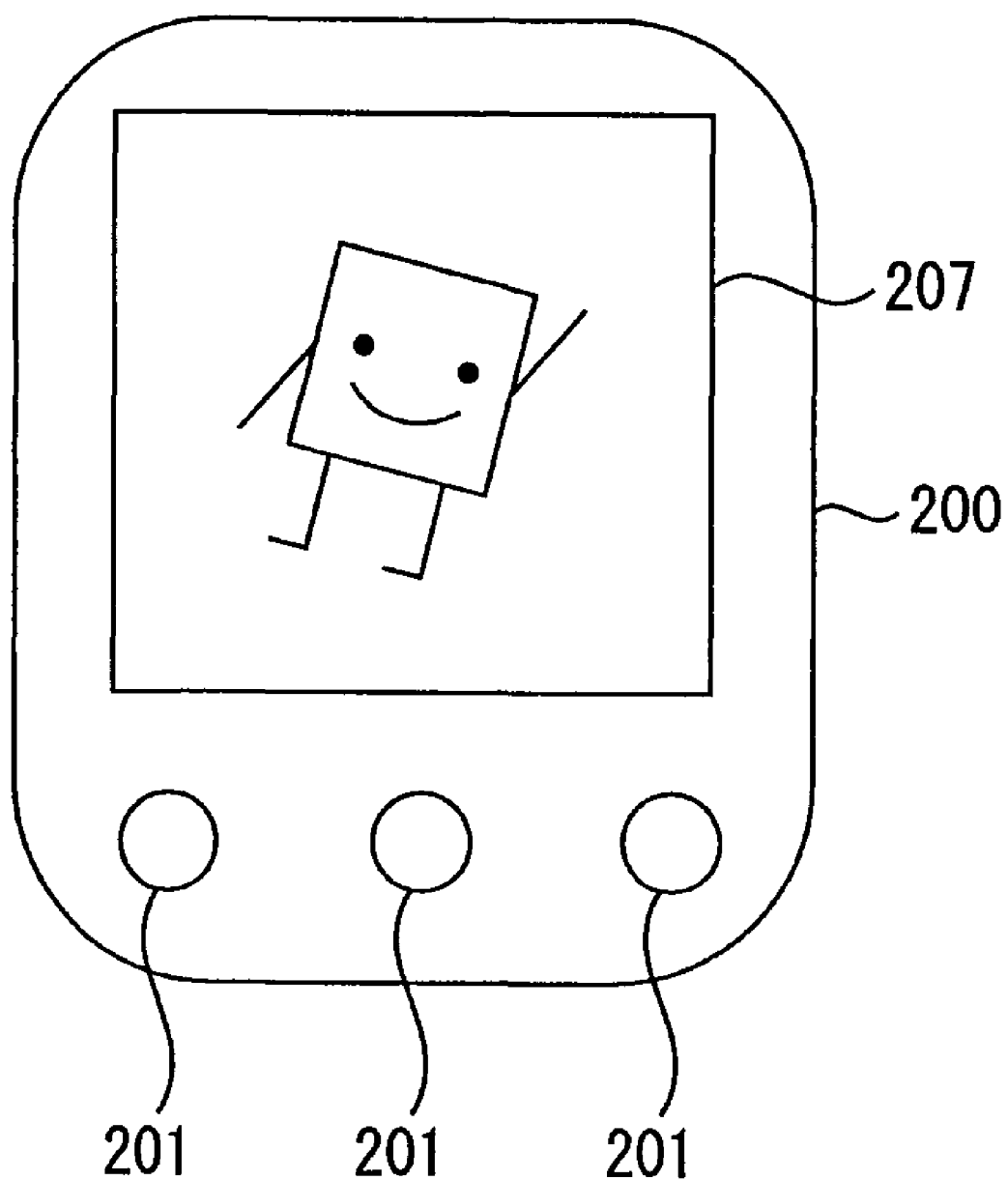
FIG. 3 illustrates an external appearance of an accessory device in FIG. 2.

FIG. 3 illustrates an external appearance of the accessory device 200. As shown in FIG. 3, the accessory device 200 has a small size for easy portability and a child-friendly shape which arouses the interests of children.

FIG. 4 is a schematic block diagram of the accessory device 200. Since a nonvolatile memory 208 is the only component specific to the accessory device 200 for the student electronic musical instrument 100, the nonvolatile memory 208 is solely described here and a description of the other components will be omitted. Since the accessory device 200 has a small size as described above, it uses a small-size LCD 207 as its display unit.

For example, a Non-Volatile (NV) RAM, a power-backup RAM, or a flash memory can be used as the nonvolatile memory 208 although any type of nonvolatile memory may be employed.

Figure 5A:
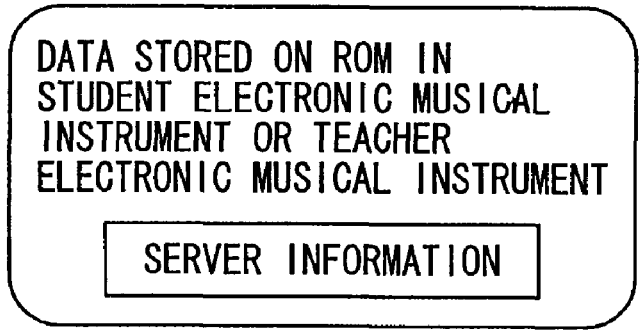
FIGS. 5*a* to 5*c* illustrate most important information used when the music teaching system of FIG. 1 performs control operations.
Figure 5B:
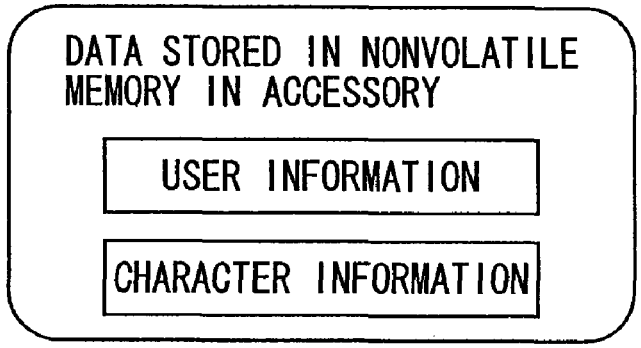
Figure 5C:
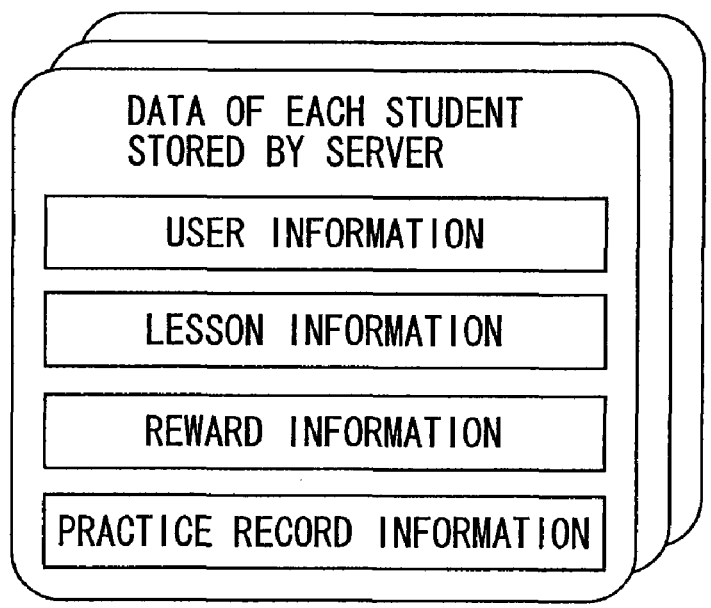

FIGS. 5a to 5c illustrate most important information used when the music teaching system of this embodiment performs control operations. FIG. 5a shows information that the student electronic musical instrument 100 (or the teacher electronic musical instrument 300) stores in the ROM 6, FIG. 5b shows information that the accessory device 200 stores in the nonvolatile memory 208, and FIG. 5c shows information that the server 400 stores in an external storage device (not shown).

The student electronic musical instrument 100 or the teacher electronic musical instrument 300 stores server information as shown in FIG. 5a. The server information includes information indicating the position of the server as an access destination on the communication network 500, which is expressed by, for example, a uniform Resource Locator (URL). Different server information may be used for the student electronic musical instrument 100 and the teacher electronic musical instrument 300.

The accessory device 200 stores user information and character information as shown in FIG. 5b. The user information includes a user ID (for example, a login name) and a password of a student who possesses the accessory device 200. The character information includes information indicating the states of a character (see FIG. 3) that is displayed on the LCD 207 of the accessory device 200. The states of the character are specifically the degree of vitality, the degree of growth, the personality, acquired items, and the like of the character, which these are merely virtual states.

The server 400 stores user information, lesson information, reward information, and practice record information. The user information includes user IDs (login names) and passwords of students, which are referred to when the student electronic musical instrument 100 logs into the server 400. The lesson information includes test music selection information (ID, etc.), test music performance data (which may include information indicating the music score position), an advice of the teacher (which may include information indicating the music score position), and a message from the teacher. The reward information is information that makes a change to the state of the character. Specifically, the reward information includes a change in the vitality, a change in the degree of growth, a change in the personality, and an addition or removal of items such as a hat or shoes of the character. The reward information is virtual information since it is associated with the states of the character. The teacher checks the practice record information and prepares reward information containing information corresponding to the checked result. Alternatively, a program on the server 400 may automatically generate the reward information based on the practice record information (specifically, advancement of the performance skill, a total practice time, the number of pressed keys, and an automatic scoring result). The reward information is not necessarily always positive. When the practice result is negative, the reward information may be information which changes the state of the character so that the vitality of the character is reduced, the degree of the growth is decreased, the character becomes old and infirm, the personality is worsened, or the character loses an item. The practice record information is a record of practices that the student has done according to the lesson information. Specifically, the practice record information includes the number of times an accompaniment has been played, the number of pressed keys, a total practice time, a part of the music score up to which its performance has been played, a scoring result obtained by a scoring function, or performance data in which pressed keys are recorded without change (for example, performance data in Standard MIDI File (SMF) format).

An overview of a control process performed by the music teaching system configured as described above will first be described with reference to FIG. 6 and then be described in detail with reference to FIGS. 7 to 12.

FIG. 6 illustrates an example of a character displayed on the display unit 9 of the student electronic musical instrument 100.

If the student places the accessory device 200 on the student electronic musical instrument 100 that is powered on, then the student electronic musical instrument 100 obtains user information from the accessory device 200 and logs into the server 400 based on the obtained user information. The student electronic musical instrument 100 obtains character information from the accessory device 200 and generates a character based on the obtained character information and displays the generated character on the display unit 9. In addition, the student electronic musical instrument 100 obtains reward information and lesson information of the student from the server 400 and changes the generated character based on the obtained reward information (see FIG. 6a). After displaying the changed character on the display unit 9, the student electronic musical instrument 100 selects a test music based on the obtained lesson information and displays an image according to the lesson information (see FIG. 6b).

When the student conducts a practice according to the lesson image on the display unit 9, the student electronic musical instrument 100 records the practice. If the student terminates the practice and separates the accessory device 200 from the student electronic musical instrument 100, then the student electronic musical instrument 100 updates the practice record information on the server 400 and then logs out of the server 400.

On the other hand, if the accessory device 200 is placed on the teacher electronic musical instrument 300 that is powered on, the teacher electronic musical instrument 300 logs into the server 400 and generates and displays a character based on character information obtained from the accessory device 200 in the same manner as the student electronic musical instrument 100 does. Then, the teacher electronic musical instrument 300 obtains practice record information from the server 400 and displays it on the display unit. The teacher views the displayed practice record information and determines reward information. If the teacher inputs the determined reward information through a specific user interface (UI) on the teacher electronic musical instrument 300, then the teacher electronic musical instrument 300 writes the input reward information to the server 400.

For example, a student who commutes to a music classroom conducts a musical performance practice by placing an accessory device 200 on a student electronic musical instrument 100 located at their home in the above manner and then goes to the music classroom with the accessory device 200. Then, a teacher places the accessory device 200 of the student on the teacher electronic musical instrument 300 to display a practice record of the student. The teacher views the practice record and inputs reward information to the teacher electronic musical instrument 300. Accordingly, the teacher electronic musical instrument 300 writes the input reward information to the server 400. After the lesson of the music classroom is finished, the student carries the accessory device 200 back to the home and then places the accessory device 200 on the student electronic musical instrument 100. Then, the student electronic musical instrument 100 changes and displays the character, which was displayed before the student went to the music classroom, according to the reward information input by the teacher. That is, the character is continually changed according to performance practices of the student. This allows the student to change the character to become better and thus to practice the performance a lot, thereby improving the motivation of the performance practice of the student. Accordingly, the student does not feel uncomfortable practicing the performance, thereby allowing the student to continue practicing the performance with enjoyment.

The following is a detailed description of this control process.

Figure 7:
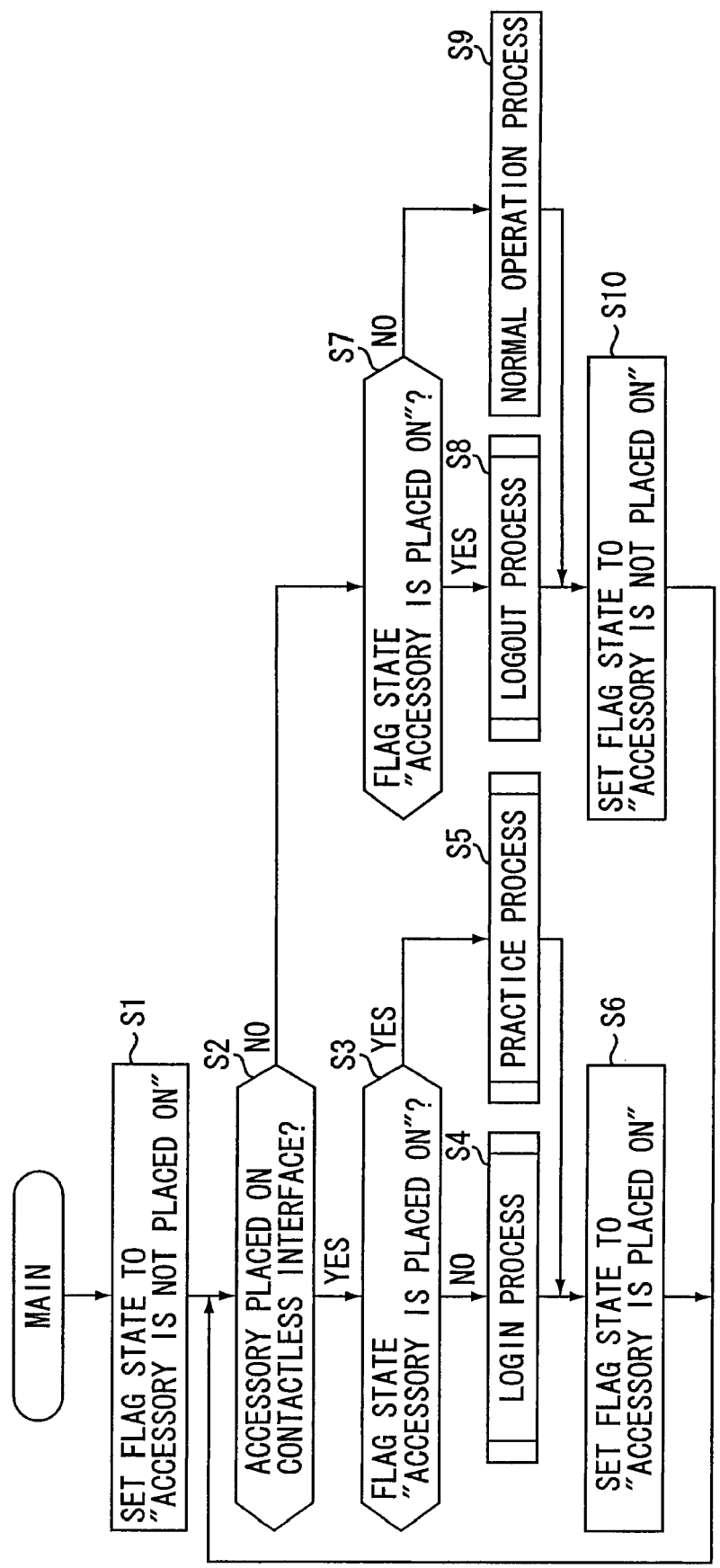
FIG. 7 is a flow chart illustrating a procedure of a main routine performed by the student electronic musical instrument of FIG. 2 (specifically, by a CPU therein).

FIG. 7 is a flow chart illustrating a procedure of a main routine performed by the student electronic musical instrument 100 (specifically, by the CPU 5).

In the main routine, the CPU 5 performs the following processes:

(1) Login Process (step S4)
(2) Practice Process (step S5)
(3) Logout Process (step S8)
(4) Normal Operation Process (step S9)

The login process (1) and the practice process (2) are performed when the accessory device 200 is placed on the student electronic musical instrument 100. The logout process (3) and the normal operation process (4) are performed when the accessory device 200 is placed on the student electronic musical instrument 100. In this manner, the main routine is divided into two sections depending on whether or not the accessory device 200 is placed on the student electronic musical instrument 100. Therefore, the CPU 5 always checks whether or not the accessory device 200 is placed on the student electronic musical instrument 100 and selects one of the two divided sections of the main routine according to the checked result and performs the selected section (step S2).

The login process (1) is performed once when the accessory device 200 is first placed on the student electronic musical instrument 100 after the accessory device 200 is not placed on it for a predetermined time or more. The logout process (3) is performed once when the accessory device 200 is first separated from the student electronic musical instrument 100 after it is placed on the student electronic musical instrument 100 for a predetermined time or more. Thus, we define a flag which is set to "1" (step S6) when the accessory device 200 is placed on the student electronic musical instrument 100 and is reset to "0" (step S10) when the accessory device 200 is not placed on it. The CPU 5 always checks whether or not the value of the flag has been switched (steps S3 and S7) and performs the login process (1) when the value of the flag has been switched from "0" to "1" and performs the logout process (3) when the value of the flag has been switched from "1" to "0". When the value of the flag is not changed, either the practice process (2) (flag="1") or the normal operation process (4) (flag="0") is performed according to the value of the flag.

Figure 8:
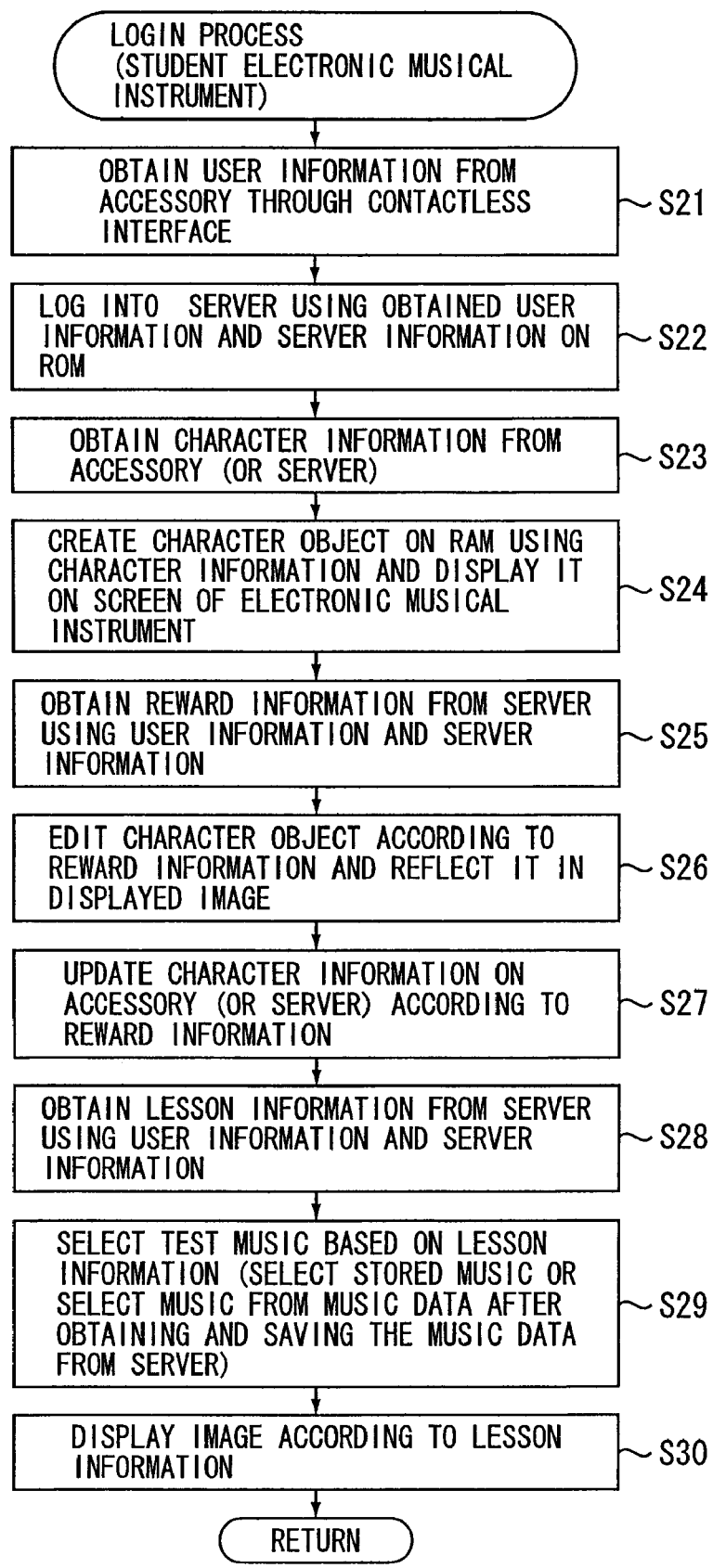
FIG. 8 is a flow chart illustrating a detailed procedure of a login process in FIG. 7.

FIG. 8 is a flow chart illustrating a detailed procedure of the login process (1).

As shown in FIG. 8, first, the CPU 5 obtains user information stored in the nonvolatile memory 208 from the accessory device 200 through the contactless communication interface 11 (step S21). Then, the CPU 5 reads server information stored in the ROM 6 and accesses a server 400 indicated by the read server information through the communication interface 14 and the communication network 500 and logs into the server 400 using the obtained user information (step S22). Since user information of each registered student is stored in the server 400 as described above, the server 400 compares the user information (i.e., a login name and a password) transmitted from the student electronic musical instrument 100 with user information (i.e., a login name and a password) in the server 400 and permits login of the student electronic musical instrument 100 if the two user information are identical.

Figure 6A:
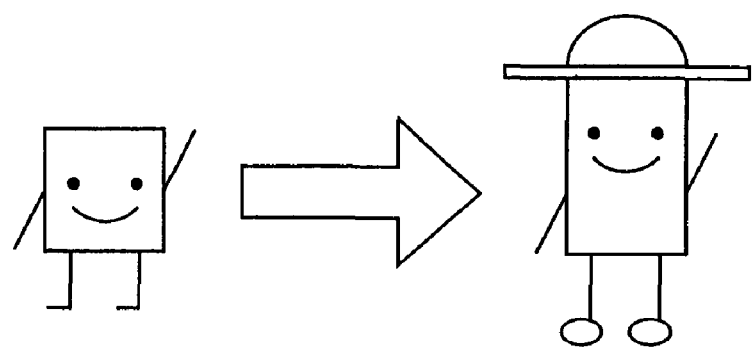
FIGS. 6*a* and 6*b* illustrate an example of a character displayed on a display unit of the student electronic musical instrument of FIG. 2.

Then, the CPU 5 obtains character information stored in the nonvolatile memory 208 from the accessory device 200 through the contactless communication interface 11 (step S23). Using the character information, the CPU 5 creates and stores a group of image data (hereinafter referred to as "character objects"), which is required to display a character in an animated fashion, in a character object storage area (not shown) reserved in a specific portion of the RAM 7. The CPU 5 sequentially reads character objects stored in the character object storage area at specific times and provides them to the display unit 9 (step S24). Accordingly, for example, the character on the left side of FIG. 6a is displayed in an animated fashion on the display unit 9. Since a process in parentheses in step S23 is performed when an accessory device as shown in FIG. 13, which has a different configuration from that of the accessory device 200, is employed (i.e., since this login process is commonly applied when the accessory device 200 is employed and when the accessory device of FIG. 13 is employed), the process in parentheses in step S23 is not associated with this embodiment. The same is true in a flow chart of FIG. 11.

The CPU 5 then obtains reward information from the server 400 using the user information and the server information (step S25). Specifically, the CPU 5 sends a request for transmission of reward information of a student corresponding to a login name in the user information to a server 400 indicated by the server information through the communication interface 14 and the communication network 500. In response to this request, the server 400 reads reward information of the student corresponding to the received login name from a plurality of information which is stored for each student in the server 400 as described above, and transmits the read reward information to the student electronic musical instrument 100. By receiving the reward information transmitted from the server 400, the student electronic musical instrument 100 obtains the reward information of the student who possesses the accessory device 200.

The CPU 5 then edits the character object according to the obtained reward information and reflects it in the displayed image. The reward information is information that makes a change to the states of the character that are represented by the character information as described above. More specifically, the character information represents the degree of vitality, the degree of growth, the personality, acquired items, and the like of the character, whereas the reward information represents a change in the vitality, a change in the degree of growth, a change in the personality, and an addition or removal of items such as a hat or shoes of the character. That is, the character object created using the character information can be changed according to the reward information without changing the overall feel of the character. FIG. 6a illustrates that the character on the left side is changed to the character on the right side according to the reward information. In the illustrated example, the degree of growth is increased and a hat is added as an item to the character according to the obtained reward information.

The CPU 5 then changes the obtained character information according to the obtained reward information and updates (or overwrites) the character information in the nonvolatile memory 208 of the accessory device 200 with the changed character information (step S27). The update of the character information in the nonvolatile memory 208 is also performed through the contactless communication interface 11. Since data communication between the student electronic musical instrument 100 (or the teacher electronic musical instrument 300) and the accessory device 200 is performed always through the contactless communication interface 11, the data communication will be described only when the data communication is performed using another device. Data communication between the student electronic musical instrument 100 (or the teacher electronic musical instrument 300) and the server 400 will also be described only when the data communication is performed using devices other than the communication interface 14 and the communication network 500.

Figure 6B:
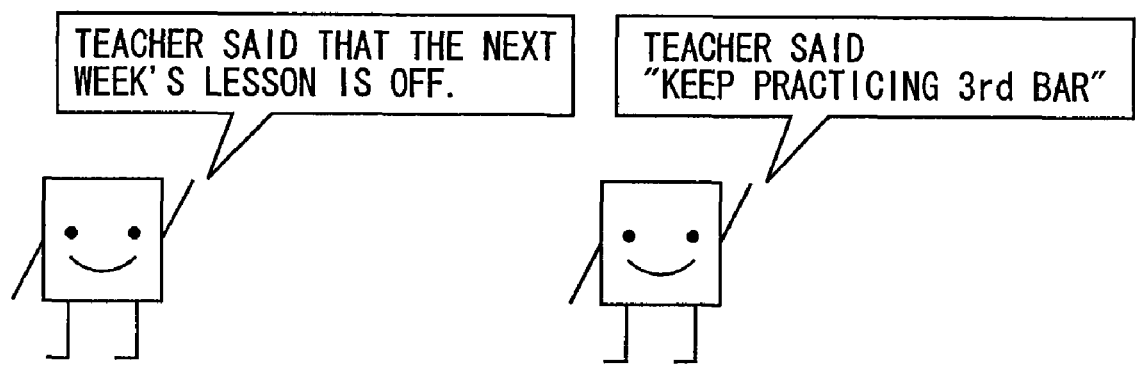

Then, the CPU 5 obtains lesson information from the server using the user information and the server information in the same manner as step S25 (step S28) and selects a test music based on the obtained lesson information (step S29) and then displays an image according to the lesson information (step S30). The character image on the left side of FIG. 6b illustrates an example character image when the obtained lesson information includes a message from the teacher and the character image on the right side of FIG. 6b illustrates an example character image when the obtained lesson information includes a test music and an advice of the teacher. When the obtained lesson information includes a test music and an advice of the teacher, it is preferable that the advice image of the character be displayed in combination with a music score of the test music selected at step S29 or the advice image and the music score be displayed alternately so that the specified music score position is displayed.

Figure 9:
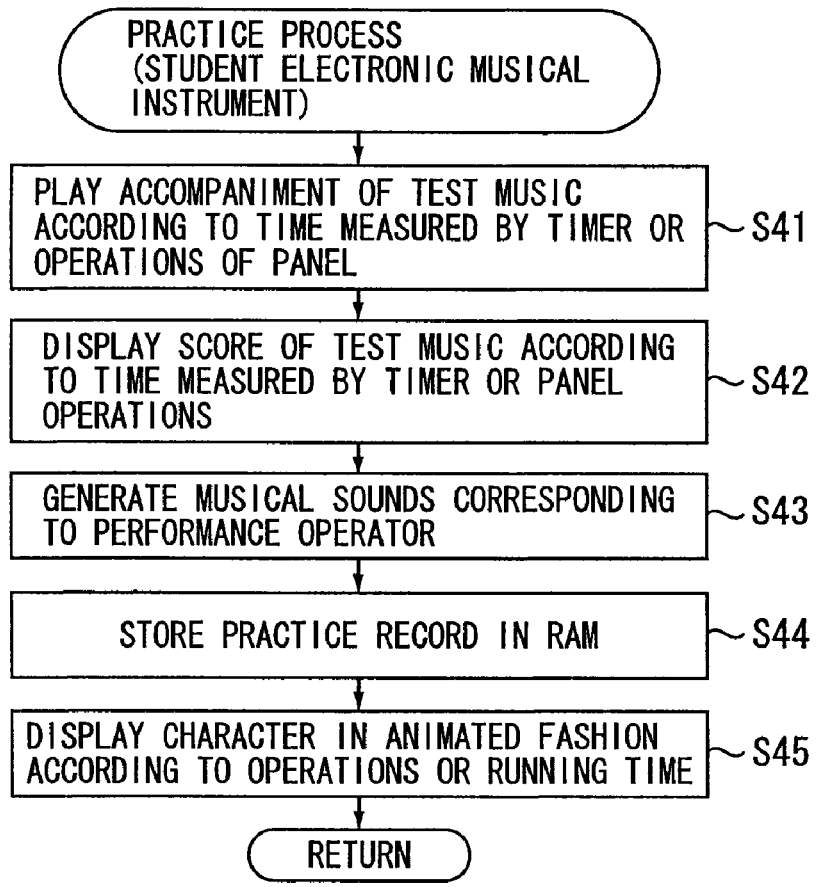
FIG. 9 is a flow chart illustrating a detailed procedure of a practice process in FIG. 7.

FIG. 9 is a flow chart illustrating a detailed procedure of the practice process (2).

In the illustrated practice process, the CPU 5 automatically plays an accompaniment of the test music selected at step S29 (step S41) and displays the music score of the test music in synchronization with the automatic accompaniment (step S42). Through the tone generator circuit 15, the effect circuit 15, and the sound system 17, the CPU 5 then generates musical sounds corresponding to the performance operator operated by the student as the student plays a performance according to the displayed music score (step S43). A further description is omitted herein since the illustrated practice process is not different from the normal practice process up to this step.

Then, the CPU 5 stores a record of a performance played by the student (i.e., a practice record) in a practice record storage area (not shown) reserved in a specific portion of the RAM 7 (step S44). Similarly to the practice record information illustrated in FIG. 5c, examples of the practice record include the number of times an accompaniment has been played, the number of pressed keys, a total practice time, a part of the music score up to which its performance has been played, a scoring result obtained by a scoring function, or performance data in which pressed keys are recorded without change (for example, performance data in Standard MIDI File (SMF) format).

The CPU 5 also displays the character on the display unit 9 in an animated fashion according to the performance operations or the total practice time in order to prevent the student from being tired of practicing the performance (step S45).

Figure 10:
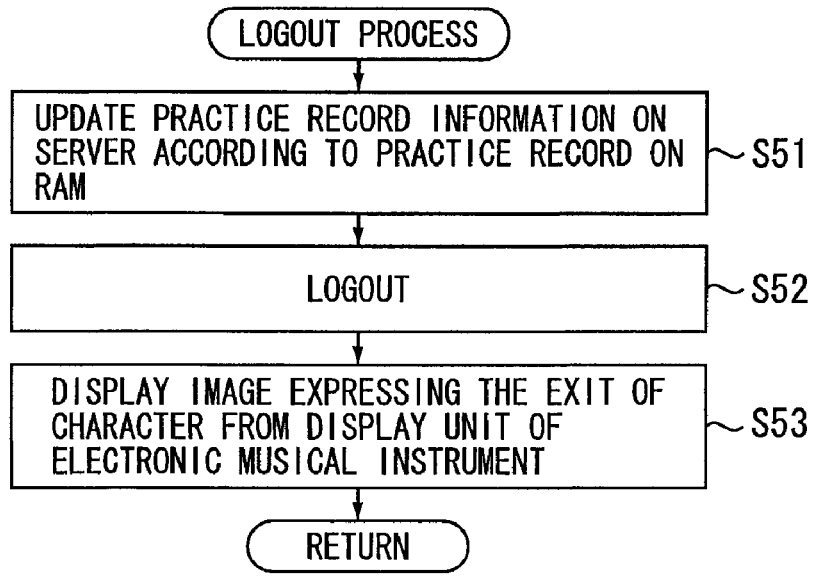
FIG. 10 is a flow chart illustrating a detailed procedure of a logout process in FIG. 7.

FIG. 10 is a flow chart illustrating a detailed procedure of the logout process (3).

First, the CPU 5 updates (or overwrites) practice record information corresponding to the student stored in the server 400 according to the practice record stored in the practice record storage area (step S51).

The CPU 5 then causes the student electronic musical instrument 100 to log out of the server 400 (step S52) and displays an image expressing exit of the character from the display unit 9 (step S73). The character which has exited the display unit 9 moves, without change, to the LCD 207 of the accessory device 200 (see step S74 of FIG. 12 which will be described later).

The normal operation process (4) is a process of the student electronic musical instrument as a normal musical instrument. Examples of the normal operation process (4) include a process for generating musical sounds as keys are pressed or performance data is played automatically.

A main routine performed by the teacher electronic musical instrument 300 will now be described.

Since the main routine of the teacher electronic musical instrument 300 is the same as that of FIG. 7 except that it has no practice process (2), the main routine of FIG. 7 excluding the practice process (2) is used as that of the teacher electronic musical instrument 300.

Figure 11:
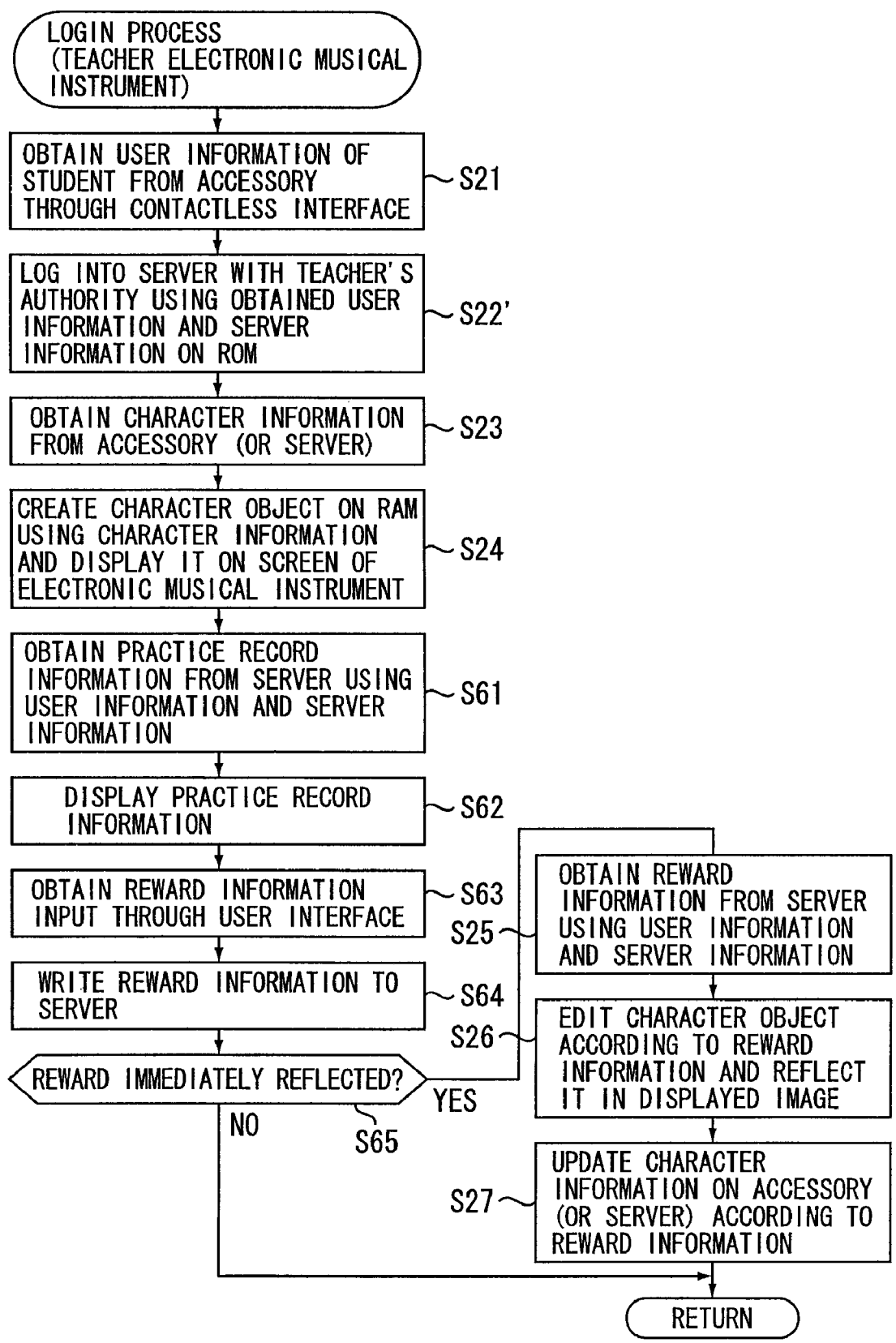
FIG. 11 is a flow chart illustrating a detailed procedure of a login process of a teacher electronic musical instrument in FIG. 1.

FIG. 11 is a flow chart illustrating a detailed procedure of a login process of the teacher electronic musical instrument 300. In FIG. 11, the same steps as those of the login process of the student electronic musical instrument 100 of FIG. 8 are denoted by the same reference numerals as those of FIG. 8. This login process is activated once when the accessory device 200 is first placed on the teacher electronic musical instrument 300 after the accessory device 200 is not placed on it for a predetermined time.

In this login process, first, the CPU 5 causes the teacher electronic musical instrument 300 to log into the server and displays a character on the display unit of the teacher electronic musical instrument 300 (steps S21 to S24). The steps S21 to S24 of this login process are almost the same as those of the login process of the student electronic musical instrument 100. However, this login process differs from that of the student electronic musical instrument 100 in that the teacher electronic musical instrument 300 logs into the server 400 with the authority of the teacher (step S22'). The purpose of logging into the server 400 with the authority of the teacher in this login process is to restrict each student's access to reward information and practice record information among information of each student stored in the server 400 since it is not necessary (or it is not suitable) to allow the student to freely overwrite the reward information and the practice record information. Server information for the teacher used for login may be different from that for the student. User information for the teacher may be previously input through a specific UI to log into the server and information to be accessed with user information for the student obtained from the accessory device may then be specified (the same is true for the logout).

The CPU 5 then obtains practice record information from the server 400 using user information and server information (step S61) and then displays the obtained practice record information (step S62). If the teacher determines reward information by viewing the displayed practice record information and inputs reward information through a specific UI, then the CPU 5 obtains the input reward information and writes it to the server 400 (step S64).

When it is desired to immediately reflect the reward information in the accessory device 200, the CPU 5 reflects it in the same manner as steps S25 to S27 of FIG. 8 (steps S25 to S27).

In the case where the reward information is immediately reflected, character information of the accessory device 200 may be directly changed instead of writing elements of the reward information one by one to the server 400. On the other hand, if it is desired to reflect the reward information in the accessory device 200 at a later time, any reflection process is not performed in this login process. Thereafter, when the student logs into the server 400 using the student electronic musical instrument 100 of the student, the reward information is reflected in the accessory device 200 as described above in steps S25 to S27 of FIG. 8.

A description of the logout process and the normal operation process performed by the teacher electronic musical instrument 300 is omitted herein since the logout process and the normal operation process are the same as those performed by the student electronic musical instrument 100.

Figure 12:
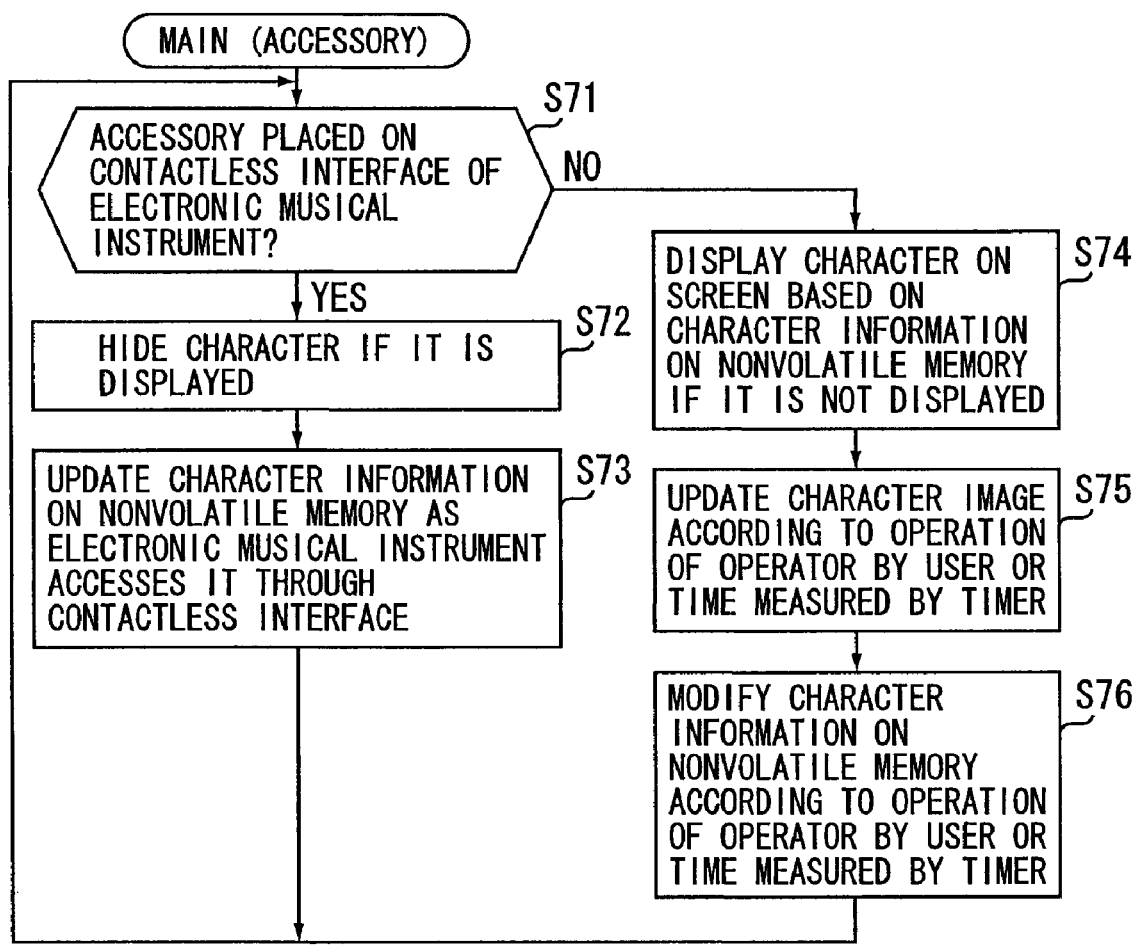
FIG. 12 is a flow chart of a procedure of a main routine performed by the accessory device of FIG. 4 (specifically, by a CPU therein).

FIG. 12 is a flow chart of a procedure of a main routine performed by the accessory device 200 (specifically, by the CPU 203).

The main routine is divided into two procedures, i.e., a procedure when the accessory device 200 is placed on a contactless interface of an electronic musical instrument (which may be the student electronic musical instrument 100 or the teacher electronic musical instrument 300) and a procedure when the accessory device 200 is not placed on the contactless interface.

When the accessory device 200 is placed on the contactless interface of the electronic musical instrument, the image of the character is to be moved from the LCD 207 of the accessory device 200 to the display unit of the electronic musical instrument and therefore, if a character is displayed on the LCD 207, the CPU 203 hides the character (i.e., causes the LCD 207 not to display the character) (step S71→S72). Then, the CPU 203 updates character information stored in the nonvolatile memory 208 as the electronic musical instrument accesses it through the contactless communication interface 209 (step S83). This character information update includes the update achieved by the process of step S27 of FIG. 8 performed by the student electronic musical instrument 100 and the update achieved by the process of step S27 of FIG. 11 performed by the teacher electronic musical instrument 300. That is, this process is to record significant positive changes as the student practices a performance such as an increase in the vitality of the character, an improvement of the personality, an increase in the degree of growth, or an acquisition of the capability to obtain an item.

On the other hand, when the accessory device 200 is not placed on the contactless communication interface of the electronic musical instrument, the image of the character is to be moved from the display unit of the electronic musical instrument back to the LCD 207 of the accessory device 200 and therefore, if no character is displayed on the LCD 207, the CPU 203 creates a character based on the character information stored in the nonvolatile memory 208 and displays the character on the LCD 207. Then, to cause the created character to move around on the LCD 207, the CPU 203 updates the image of the character according to a time measured by a timer or an operation of an operator 201 by the user (step S75). The CPU 203 also modifies character information stored in the nonvolatile memory 208 according to the time measured by the timer or the operation of the operator 201 by the user (step S76). This modification, for example, when the student is lazy in practicing the performance, includes modification of virtual information such as a reduction in the vitality of the character, a decrease in the degree of growth, making the character old and infirm, or the loss of an item held by the character. When the student virtually plays with the character using the operator 201, a small positive change may be made to the character. However, in this case, any significant positive change as that made when the student practices the performance cannot be made to the character.

When the guardian PC 101 is connected to the communication network 500 as shown in FIG. 1, the guardian may view the lesson information of the student in the server 400 using the guardian PC 101 or may add reward information, separately from the teacher.

The teacher electronic musical instrument 300 is not necessarily embodied as a musical instrument and may also be embodied as a PC as described above. When a PC is used as the teacher electronic musical instrument 300, the normal operation process of the main routine is not a process of the teacher electronic musical instrument as a normal musical instrument and is, for example, a score management process in which practice record information of the student is estimated and managed. Of course, this does not mean that the normal operation process is limited to the score management process. In the login process of the teacher electronic musical instrument 300, the accessory device 200 is used to log into the server 400 in the same manner as in the login process of the student electronic musical instrument 100. However, if a PC is used as the teacher electronic musical instrument 300, student user information may be manually input and the student user information may then be used to log into the server 400 to view or edit a variety of information of the student. The guardian PC 101 can simply perform these control processes since the guardian PC 101 is a type of PC.

Figure 13A:
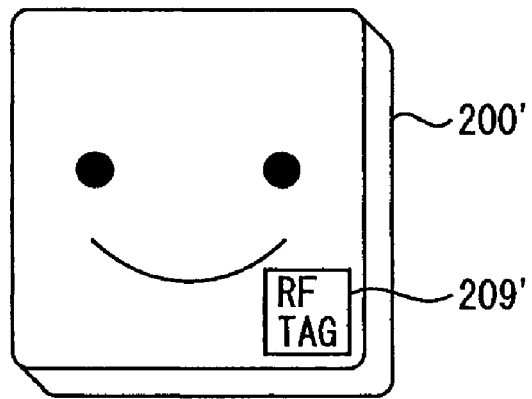
FIGS. 13*a* and 13*b* illustrate an accessory device having a different configuration from that of the accessory device of FIG. 4.
Figure 13B:
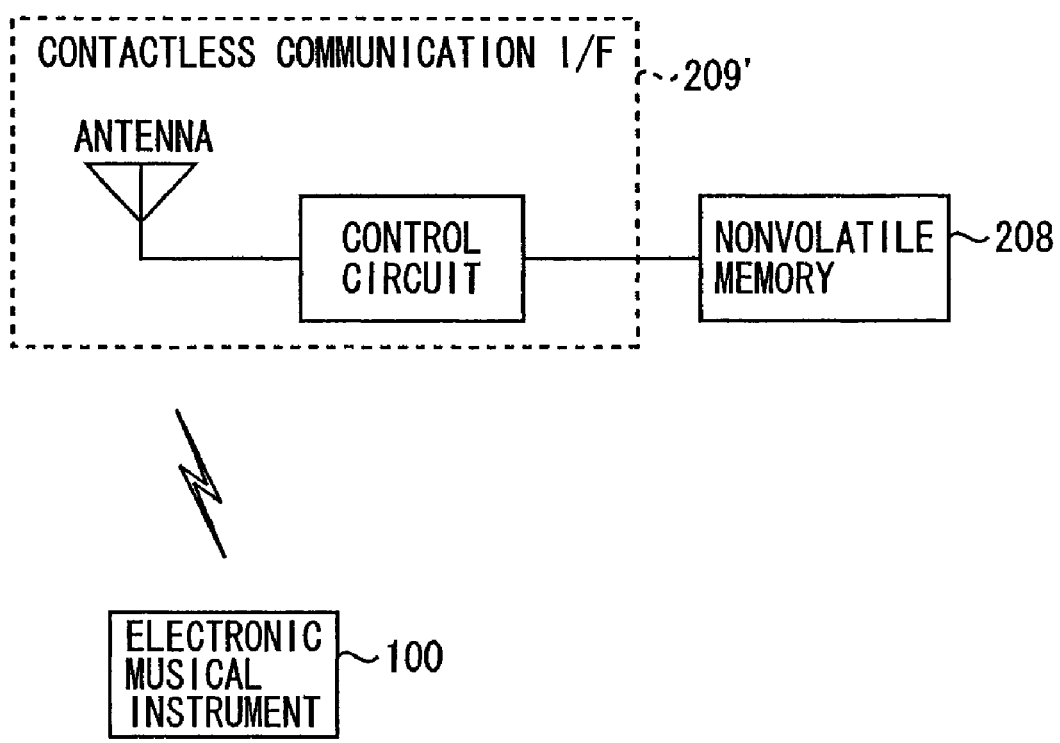

FIGS. 13a and 13b illustrate an accessory device 200' having a different configuration from that of the accessory device 200, where FIG. 13a shows an external appearance of the accessory device 200' and FIG. 13b shows a control structure of the accessory device 200'.

As shown in FIG. 13a, the external appearance of the accessory device 200' has a shape corresponding to the image of the character displayed on the LCD 207 of the accessory device 200. Although any material may be used for the accessory device 200', one can consider, for example a stuffed toy. The purpose of forming the accessory device 200' with such a shape and material is only to attract the interest of young students. Since such a material and shape is not essential in applying the present invention, the accessory device may have an insipid shape (for example, a plate shape) and may also be colored with a single color.

An RF tag 209' is embedded in the accessory device 200'. A passive one is employed as the RF tag 209'. Even if the RF tag 209' is a passive one, it can be considered as a contactless communication interface as shown in FIG. 13b. The nonvolatile memory 208 is also connected to the RF tag 209'. A variety of information can be written to the nonvolatile memory 208 using a writer for RF tags. Therefore, if a reader/writer for RF tags is employed as the contactless communication interface of the electronic musical instrument, user information and character information can be written to the nonvolatile memory 208 of the accessory device 200' as with the accessory device 200. However, since the RF tag reader/writer is too large in both size and price, compared to the simple RF tag reader, a simple RF tag reader is employed as the contactless communication interface of the electronic musical instrument and a reader/writer prepared in a different place is used when writing information to the nonvolatile memory 208 of the accessory device 200'. Accordingly, the user information alone is previously stored in the nonvolatile memory 208 of the accessory device 200' and information in the nonvolatile memory 208 is not overwritten with the contactless communication interface of the electronic musical instrument.

When the accessory device 200' is employed, the same main routine as that of FIG. 7 is basically used for each of the student electronic musical instrument 100 and the teacher electronic musical instrument 300. However, the character information is stored on the server since it is not stored in the nonvolatile memory 208 of the accessory device 200'. Accordingly, the processes of steps S23 and S27 in the login process of the student electronic musical instrument 100 of FIG. 8 are replaced with processes in parenthesizes. For the same reason, the processes of steps S23 and S27 in the login process of the teacher electronic musical instrument 300 of FIG. 11 are replaced with processes in parenthesizes.

Since the accessory device 200' only permits data readout, the accessory device 200' does not perform the main routine performed by the accessory device 200 which is described above with reference to FIG. 12.

It is not possible to display a character on the accessory device 200'. However, since a character is created and displayed on the display unit 9 of the student electronic musical instrument 100 when the accessory device 200' is placed on the student electronic musical instrument 100 in the same manner as when the accessory device 200 is placed on the student electronic musical instrument 100, using the accessory device 200' also improves the motivation of the performance practice of students who commute to the music classroom.

Although the interface between the accessory device and the student electronic musical instrument or a teacher device for teaching is preferably a proximity contactless interface, it does not matter whether it is a neighborhood contactless interface or a contact-type interface. Hereinafter, the term "teacher apparatus for teaching" is used rather than the term "teacher electronic musical instrument" since it is not necessarily embodied as a musical instrument and may also be embodied as a PC. The contact-type interface includes a type of interface having electrodes exposed on its contact surface or a type of interface having a connector for connection between them.

The teacher apparatus for teaching may also have the functions of a student electronic musical instrument. This is because, for example, some electronic musical instruments for a small-size musical classroom are used for both the teacher and the students.

Needless to say, the object of the invention is also achieved by providing a system or a device with a machine readable storage medium, in which program codes of software for implementing the functions of the above-described embodiment are recorded, and by causing a computer (a CPU or an MPU) of the system or device to read and execute the program codes stored in the storage medium.

In this case, the program codes read from the storage medium implement, by themselves, the novel functions of the invention, and the program codes and the storage medium in which the program codes are stored constitute the present invention.

For example, a floppy disk, hard disk, magneto-optical disc, CD-ROM, CD-R, CD-RW, DVD-ROM, DVD-RAM, DVD-RW, DVD+RW, magnetic tape, nonvolatile memory card, ROM, or the like can be used as the machine readable storage medium which contains the program codes. The program codes may also be provided from a server computer through a communication network.

Further, needless to say, the invention includes not only an implementation of the functions of the above-described embodiment by allowing the computer to execute the read program codes but also an implementation of the functions by allowing an OS or the like running on the computer to perform all or part of the actual processes.

Needless to say, the invention also includes an implementation of the functions of the above-described embodiment by writing the program codes read from the storage medium to a memory provided on a function expansion board inserted in the computer or provided in a function expansion unit connected to the computer and then causing a CPU or the like, provided in the function expansion board or the function expansion unit, to perform all or part of the actual processes based on instructions of the program codes.

What is claimed is:

1. An electronic musical system comprising:
a server that stores at least musical lesson information;
an electronic musical instrument logically connectable to the server; and
a portable accessory device that stores at least user information of a user of the portable accessory device and logically connectable to the electronic musical instrument,
wherein one of the server or the portable accessory device stores character information representing a character associated with the user, and
wherein the electronic musical instrument comprises:
an interface part that obtains at least the user information from the portable accessory device while the portable accessory device is logically connected to the electronic musical instrument;
an access part that accesses the server using the user information from the portable accessory device obtained through the interface part;
a character information acquisition part that obtains the character information from the server based on the user information or the portable accessory device;
a lesson information acquisition part that obtains, from the server, the musical lesson information, which represents a musical lesson work to be practiced based on the user information;
a display device; and
a control part that performs control operation to display on the display device, the character associated with the user based on the character information obtained by the character information acquisition part, and the musical lesson information obtained by the musical lesson information acquisition part, while the portable accessory device is logically connected to the electronic musical instrument through the interface part.

2. The electronic musical instrument according to claim 1, further comprising:
a reward information acquisition part that obtains, from the server, reward information representing a reward for practicing the musical lesson work based on the user information;
a change part that changes the obtained character information based on the reward information obtained by the reward information acquisition part; and
an updating part that updates the character information based on the user information in accordance with the changed character information,
wherein the control part performs the control operation to display the character based on the changed character information on the display device.

3. The electronic musical instrument according to claim 1, further comprising:

a recording part that records a performance operation of the electronic musical instrument performed for the musical lesson work while the electronic musical instrument is logically connected to the portable accessory device; and a change part that changes practice record information, which is stored in the server, associated with the user information, based on a record of the performance operation recorded by the recording part.

4. The electronic musical instrument according to claim 1, wherein the interface part comprises a contactless interface of a proximity type or a neighborhood type, which logically connects the portable accessory device when the portable accessory device is brought into proximity or neighborhood of the contactless interface.

5. The electronic musical instrument according to claim 1, wherein the interface part comprises a contact-type interface having exposed electrodes for electric contact with the portable accessory device or having a connector for connection with the portable accessory device.

6. An electronic musical system comprising:

a server;

an electronic musical instrument logically connectable to the server; and a portable accessory device that stores at least user information of a user of the portable accessory device and logically connectable to the electronic musical instrument, wherein one of the server or the portable accessory device stores character information representing a character associated with the user, wherein the server stores at least practice record information representing a record of musical lesson practice associated with the user, and wherein the electronic musical instrument comprises:

an interface part that obtains at least the user information from the portable accessory device while the portable accessory device is logically connected to the electronic musical instrument;

an access part that accesses the server using the user information obtained from the portable accessory device through the interface part;

a character information acquisition part that obtains the character information from the server or the portable accessory device;

a practice record information acquisition part that obtains the practice record information associated with the user information from the server;

an input part that inputs reward information representing a reward to the user in association with the user information based on the practice recording information obtained by the practice record information acquisition part;

a registration part that registers the reward information input through the input part to the server in association with the user information;

a display device; and a control part that performs control operation to display on the display device, the character associated with the user based on the character information obtained by the character information acquisition part and the reward information registered by the registration part while the portable accessory device is logically connected to the electronic musical instrument through the interface part.

7. The teaching apparatus according to claim 6, wherein the control part performs the control operation to also display the practice record information obtained by the practice record information acquisition part on the display device.

8. The teaching apparatus according to claim 6, wherein the interface part comprises a contactless interface of a proximity type or a neighborhood type, which logically connects the portable accessory device when the portable accessory device is brought into proximity or neighborhood of the contactless interface.

9. The teaching apparatus according to claim 6, wherein the interface part comprises a contact-type interface having exposed electrodes for electric contact with the portable accessory device or having a connector for connection with the portable accessory device.

10. A non-transitory machine readable medium containing a program executable by a computer, which is contained in an electronic musical instrument of an electronic musical system comprising a server that stores at least lesson information, the electronic musical instrument logically connectable to the server, and a portable accessory device that stores at least user information of a user of the portable accessory device and logically connectable to the electronic musical instrument, to perform a method comprising the steps of:

obtaining at least the user information from the portable accessory device while the portable accessory device is logically connected to the electronic musical instrument, via an interface of the electronic musical instrument;

accessing the server using the user information obtained from the portable accessory device;

obtaining character information from the server based on the user information or the portable accessory device;

obtaining, from the server, the musical lesson information, which represents a musical lesson work to be practiced based on the user information; and performing control operation to display on a display device, the character associated with the user based on the obtained character information and the obtained musical lesson information while the portable accessory device is logically connected to the electronic musical instrument.

11. A non-transitory machine readable medium containing a program executable by a computer, which is contained in an electronic musical instrument of an electronic musical system comprising a server, the electronic musical instrument logically connectable to the server, and a portable accessory device that stores at least user information of a user of the portable accessory device and logically connectable to the electronic musical instrument, wherein one of the server or the portable accessory device stores character information representing a character associated with the user, and wherein the server stores at least practice recording information representing a record of musical lesson practice associated with the user, to perform a method comprising the steps of:

obtaining at least the user information from the portable accessory device while the portable accessory device is logically connected to the electronic musical instrument, via an interface of the electronic musical instrument;

accessing the server using the user information obtained from the portable accessory device;

obtaining character information from the server based on the user information or the portable accessory device;

obtaining the practice record information associated with the user information from the server;

inputting reward information representing a reward to the user in association with the user information based on the obtained practice record information;

registering the input reward information to the server in association with the user information; and performing control operation to display on a display device, the character associated with the user based on the obtained character information and the registered reward information while the portable accessory device is logically connected to the electronic musical instrument.

* * * * *